United States Patent
Rohde et al.

(10) Patent No.: US 7,761,608 B2
(45) Date of Patent: Jul. 20, 2010

(54) METHOD AND SYSTEM FOR PROCESSING MARKERS, DATA INTEGRITY FIELDS AND DIGESTS

(75) Inventors: Derek Rohde, Auburn, CA (US); Bruce A. Klemin, Rocklin, CA (US); Michael I. Thompson, Colfax, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1036 days.

(21) Appl. No.: 10/931,850

(22) Filed: Sep. 1, 2004

(65) Prior Publication Data

US 2006/0047904 A1    Mar. 2, 2006

(51) Int. Cl.
G06F 15/16 (2006.01)
G06F 13/36 (2006.01)

(52) U.S. Cl. ...................... 709/250; 711/114
(58) Field of Classification Search ............... 709/250; 710/308; 711/114; 370/469
See application file for complete search history.

(56) References Cited

U.S. PATENT DOCUMENTS

| | | | |
|---|---|---|---|
| 5,937,169 A | 8/1999 | Connery et al. | |
| 6,246,683 B1 | 6/2001 | Connery et al. | |
| 6,247,060 B1 | 6/2001 | Boucher et al. | |
| 6,334,153 B2 | 12/2001 | Boucher et al. | |
| 6,389,479 B1 | 5/2002 | Boucher et al. | |
| 6,393,487 B2 | 5/2002 | Boucher et al. | |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,470,173 B1 | 10/2002 | Okada et al. | |
| 6,470,415 B1 | 10/2002 | Starr et al. | |
| 6,591,302 B2 | 7/2003 | Boucher et al. | |
| 6,996,070 B2 * | 2/2006 | Starr et al. | 370/252 |
| 7,167,926 B1 * | 1/2007 | Boucher et al. | 709/250 |
| 7,177,941 B2 * | 2/2007 | Biran et al. | 709/232 |
| 7,185,266 B2 * | 2/2007 | Blightman et al. | 714/776 |
| 7,260,631 B1 * | 8/2007 | Johnson et al. | 709/224 |
| 7,346,701 B2 * | 3/2008 | Elzur et al. | 709/232 |
| 2001/0044912 A1 * | 11/2001 | Francis et al. | 714/30 |
| 2004/0010545 A1 * | 1/2004 | Pandya | 709/203 |
| 2004/0062267 A1 * | 4/2004 | Minami et al. | 370/463 |
| 2005/0021874 A1 * | 1/2005 | Georgiou et al. | 709/250 |
| 2005/0044349 A1 * | 2/2005 | Henry | 713/150 |
| 2005/0071131 A1 * | 3/2005 | Anderson et al. | 702/189 |

(Continued)

*Primary Examiner*—William C Vaughn, Jr.
*Assistant Examiner*—Muktesh G Gupta
(74) *Attorney, Agent, or Firm*—Klein, O'Neill & Singh, LLP

(57) ABSTRACT

A system with a host bus adapter ("HBA") having a TCP/IP offload engine is provided. The HBA includes logic for concurrently processing markers, data integrity fields ("DIFs") and digests by using plural counters that count words in a data stream and individual routing bits are set for markers, DIFs and digests based on the plural counter values. When a counter reaches a certain threshold value, then locator bits are set for a field and the locator bits are forwarded with the data stream. A marker counter is incremented when each word in a data stream passes by the marker counter and markers can be inserted at a programmed interval. For DIF calculation an offset of a first byte in a DMA transfer and partial cyclic redundancy code value is seeded into a DIF location counter, which is incremented for each byte of data that passes by the DIF location counter.

32 Claims, 9 Drawing Sheets

U.S. PATENT DOCUMENTS

2005/0129045 A1* 6/2005 Machulsky et al. ......... 370/428
2005/0286560 A1* 12/2005 Colman et al. .............. 370/474
2006/0015655 A1* 1/2006 Zur et al. ....................... 710/5

* cited by examiner

METHOD AND SYSTEM FOR PROCESSING MARKERS, DATA INTEGRITY FIELDS AND DIGESTS

BACKGROUND

1. Field of the Invention

The present invention relates to network systems, and more particularly to, processing markers, data integrity fields and digests.

2. Background of the Invention

Storage area networks ("SANs") are commonly used where plural memory storage devices are made available to various host computing systems. Data in a SAN is typically moved from plural host systems (that include computer systems, servers etc.) to a storage system through various controllers/adapters.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is another standard bus that is compatible with existing PCI cards using the PCI bus. PCI-X improves the data transfer rate of PCI from 132 MBps to as much as 1 GBps. The PCI-X standard was developed by IBM®, Hewlett Packard Corporation® and Compaq Corporation® to increase performance of high bandwidth devices, such as Gigabit Ethernet standard and Fibre Channel Standard, and processors that are part of a cluster.

Various other standard interfaces are also used to move data from host systems to storage devices. Internet SCSI (iSCSI) is one such standard as defined by the Internet Engineering Task Force (IETF) maps the standard SCSI protocol on top of the TCP/IP protocol. iSCSI (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP (Transmission Control Protocol)/IP (Internet Protocol) networks. iSCSI defines mapping of the SCSI protocol with TCP/IP.

Networks are generally defined as having layers of protocol. The iSCSI and TCP/IP protocol suite consist of 4 protocol layers; the application layer (of which iSCSI is one application), the transport layer (TCP), the network layer (IP) and the link layer (i.e. Ethernet). A complete description of the TCP/IP protocol suite is provided in "TCP/IP" Illustrated, Vol. 1 by W. Richard Stevens and Volume 2 by Gary R. Wright and W. Richard Stevens published by Addison Wesley Professional Computing Series. The following provide a brief overview of TCP, iSCSI and RDMA protocol/standards.

TCP Overview

TCP is a network protocol that provides connection-oriented, reliable, byte stream service. This means that two nodes must establish a logical connection before sending data and that TCP maintain state information regarding the data transfer. Reliable means that data is guaranteed to be delivered in the same order that it was sent. A byte stream service means that TCP views data to be sent as a continuous data stream that is sent in any way it sees fit and delivers it to the remote node as a byte stream. There is no concept of a data frame boundary in a TCP data stream.

Sequence Numbering in TCP Data Transfer

Each byte of data sent using a TCP connection is tagged with a sequence number. Each TCP segment header contains the sequence number of the first byte of data in the segment. This sequence number is incremented for each byte of data sent so that when the next segment is to be sent, the sequence number is again set for the first byte of data for that segment. The sequence numbering is used to determine when data is lost during delivery and needs to be retransmitted.

iSCSI Architecture Overview

The iSCSI architecture is based on a client/server model. Typically, the client is a host system such as a file server that issues a read or write command. The server may be a disk array that responds to the client request.

The following introduces some of the basic terms used in an iSCSI data transfer:

"Exchange"—The operations needed to do a iSCSI data read or write. An exchange consists of three operational phases: command phase, data movement phase and response phase.

"Initiator"—Typically the client is the initiator that initiates a read or write command.

"Target"—Typically a disk array is the target that accepts a read or write command and performs the requested operation.

"Read/Write"—Reads or writes are based on the initiator.

In a typical iSCSI exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete. The use of TCP guarantees the delivery of the PDUs.

Typically, logical units in the target process commands. Commands are sent by the host system in Command Descriptor Blocks ("CDB"). A CDB is sent to a specific logical unit, for example, the CDB may include a command to read a specific number of data blocks. The target's logical unit transfers the requested data block to the initiator, terminating with a status message indicating completion of the request. iSCSI encapsulates CDB transactions between initiators and targets over TCP/IP networks.

"RDMA" Overview:

Remote direct memory access (RDMA), is a communications technique that allows data to be transmitted from the memory of one computer to the memory of another computer without passing through either device's central processing unit ("CPU"), and without calling to an operating system kernel. RDMA is a response to increasing demands for network speed. Data can be transferred faster when it does not have to pass through the CPU. The Infiniband standard (incorporated herein by reference in its entirety) is an example of a form of RDMA. Applications of RDMA include clustering and storage and networking for data centers.

Markers, Data Integrity Fields ("DIFs") and Digests:

Embedded in a stream of iSCSI or RDMA data, there are three fields, which may need to be located for processing by a receiving node. These fields are referred to as: Markers, DIFs, and Digests. Each of these fields may or may not be present in a data stream regardless of the presence of the other fields. The location of each field in a data stream is unrelated, but can have an affect on locating other fields.

Markers:

Markers are inserted into a data stream periodically at a predetermined interval, starting at a given TCP sequence number. Markers are a fixed length, and indicate the offset to the start of the next protocol data unit ("PDU"). iSCSI markers are 8 bytes long, while RDMA markers are 4 bytes long. Insertion of iSCSI markers into the data stream is performed (logically) after insertion of digests and/or DIFs. Thus, iSCSI markers are not included in the Cyclic Redundancy Check (CRC) calculation for either of those fields.

RDMA markers are inserted into a data stream (logically) after the insertion of DIFs, but prior to insertion of Digests. Thus, RDMA markers are not included in the calculation of the DIF CRC, but are included in the Digest CRC calculation.

DIFs:

DIFs are 8-byte fields appended to each block of data stored on a mass storage device. A DIF contains a Reference Tag, Application Tag, and a CRC value. As a DMA occurs, it is necessary to calculate the CRC for each DIF on each data block during a transfer. Depending on the application in a system, an incoming data stream may need to insert DIFs periodically into the data stream, validate and remove them from the data stream, or validate them and keep them in the data stream. These are three different modes for processing DIFs. Calculation of the DIF CRC does not include Markers or Digests.

Digests:

Digests are 4-byte fields appended to the end of a PDU, which are a CRC calculation over the data portion of the PDU. DIFs are included in the Digest calculation for both iSCSI and RDMA. Markers are not included in the iSCSI Digest calculation, but are included in the RDMA Digest calculation.

Typically when data is received from the network and is first stored at the HBA's local memory, data may not be in order and may or may not include the markers, DIFs and digests. To process the markers, DIFs and digests before data is sent to the host (or when being sent by the host) can be cumbersome and affect overall data transfer efficiency.

In conventional systems, Markers, DIFs, and Digests are processed independently at different points in a data stream transfer. This has disadvantages because there is no overlapping protection of data by both DIF and Digest and data may get corrupted. Also, iSCSI and RDMA treat calculation of digests with respect to markers differently, so logic would need to be duplicated if both protocols were to be supported.

In data transferred by a host system, markers, DIFs, and digests are typically inserted at different stages of the data path by conventional systems. This approach has problems because there is no overlapping protection of data by DIFs and Digests and data may get corrupted. Also, iSCSI and RDMA treat calculation of digests/markers differently. In conventional systems, separate logic is needed if both protocols were to be supported. This cost of separate logic makes the overall conventional systems expensive and cumbersome.

Therefore, there is a need for a system and method that can efficiently handle markers, digests and DIFs in network data streams.

SUMMARY OF THE INVENTION

In one aspect of the present invention, a host bus adapter ("HBA") with a TCP/IP offload engine for transferring data to and from a host computing system is provided. The HBA includes logic for concurrently processing markers, data integrity fields ("DIFs") and digests by using plural counters that count words in a data stream and individual routing bits are set for markers, DIFs and digests based on the plural counter values. When a counter reaches a certain threshold value, then locator bits are set for a field and the locator bits are forwarded with the data stream.

A marker counter is incremented when each word in a data stream passes by the marker counter and markers can be inserted at a programmed interval. For DIF calculation an offset of a first byte in a DMA transfer and partial cyclic redundancy code value is seeded into a DIF location counter, which is incremented for each byte of data that passes by the DIF location counter. Also, if a digest locator counter value is equal to a protocol data unit length, then digest locator bits are set for bytes in a current word.

In yet another aspect of the present invention, a system for transferring data to and from a host computing system is provided. The system includes a TCP/IP offload engine that includes logic for concurrently processing markers, data integrity fields ("DIFs") and digests by using plural counters that count words in a data stream and individual routing bits are set for markers, DIFs and digests based on the plural counter values.

In yet another aspect of the present invention, a TCP/IP offload engine ("TOE") for transferring data to and from a host computing system is provided. The TOE includes logic for concurrently processing markers, data integrity fields ("DIFs") and digests by using plural counters that count words in a data stream and individual routing bits are set for markers, DIFs and digests based on the plural counter values.

In yet another aspect of the present invention a HBA with a TCP/IP offload engine for transferring data from a host computing system is provided. The HBA includes logic for implementing a data pipeline that tags every byte of data with routing bits used to control data flow through the data pipeline and plural counters are used to control the routing bits for concurrently processing markers, data integrity fields ("DIFs") and digests.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a system using storage devices will be described. The specific architecture and operation of the preferred embodiment will then be described with reference to the general architecture.

Figure 1:
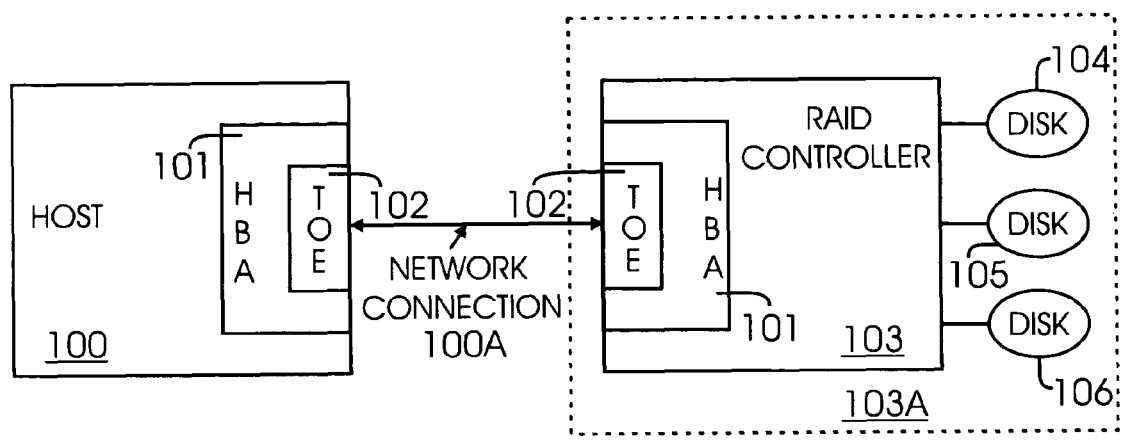
FIG. 1 shows a block diagram of a host system coupled to a storage system using a TOE accelerator, according to one aspect of the present invention.

FIG. 1 shows a block diagram of a host system 100 that is coupled to a storage system 103A via a network connection 100A. Host 100 includes a host bus adapter "HBA" 101 with a TCP/IP accelerator module "TOE" (or "chip" or "system") 102 that allows connection of SCSI based mass storage devices to a gigabit Ethernet LAN.

System 102 according to the present invention can be used for both initiator and target applications (i.e. can be used on a host bus adapter 101 or with a redundant array of inexpensive disks ("RAID") controller 103. RAID controller 103 is coupled to plural storage devices, for example, 104, 105 and 106.

System 102 provides hardware assistance to improve the speed of iSCSI read and write transactions as well as a full hardware implementation of a TCP/IP protocol stack to assure full gigabit operation. System 102 also includes an embedded gigabit Ethernet MAC, to connect a PCI based host to a LAN (not shown).

The present invention provides a hardware implementation of a full network protocol stack. Application Programming Interfaces (APIs) to this protocol stack are made available to allow host software to take advantage of the hardware acceleration for straight network applications.

The present invention may be used on a PCI development board with a Field Programmable gate Array ("FPGA"). The chip may also be integrated into an Application Specific Integrated Circuit ("ASIC") with an embedded serialize/de-serializer ("SERDES") and internal programmable random access memory ("RAM").

Figure 2:
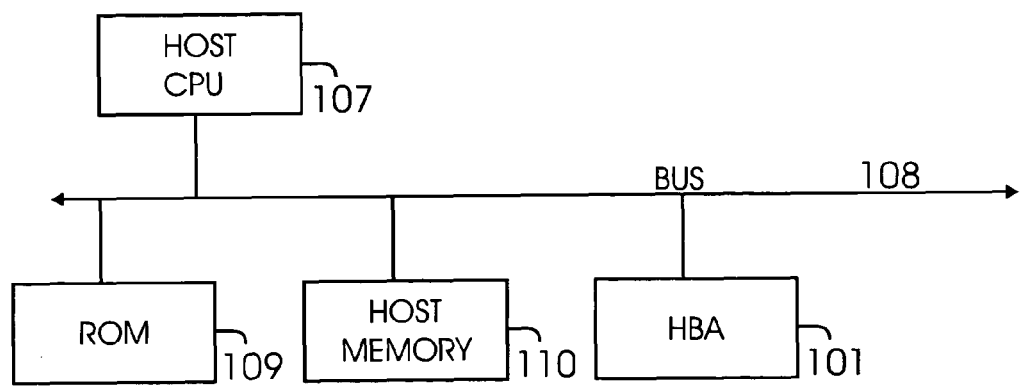
FIG. 2 is a block diagram of host system.

FIG. 2 shows a block diagram of host system 100. Host system 100 typically includes several functional components. These components may include a central processing unit (CPU) 107, main memory 110, input/output ("I/O") devices (not shown), read only memory 109, and streaming storage devices (for example, tape drives).

In conventional systems, the main memory is coupled to the CPU via a system bus 108 or a local memory bus (not shown). The main memory is used to provide the CPU 107 access to data and/or program information that is stored in main memory at execution time. Typically, the main memory is composed of random access memory (RAM) circuits. A computer system with the CPU and main memory is often referred to as a host system.

Figure 3I:
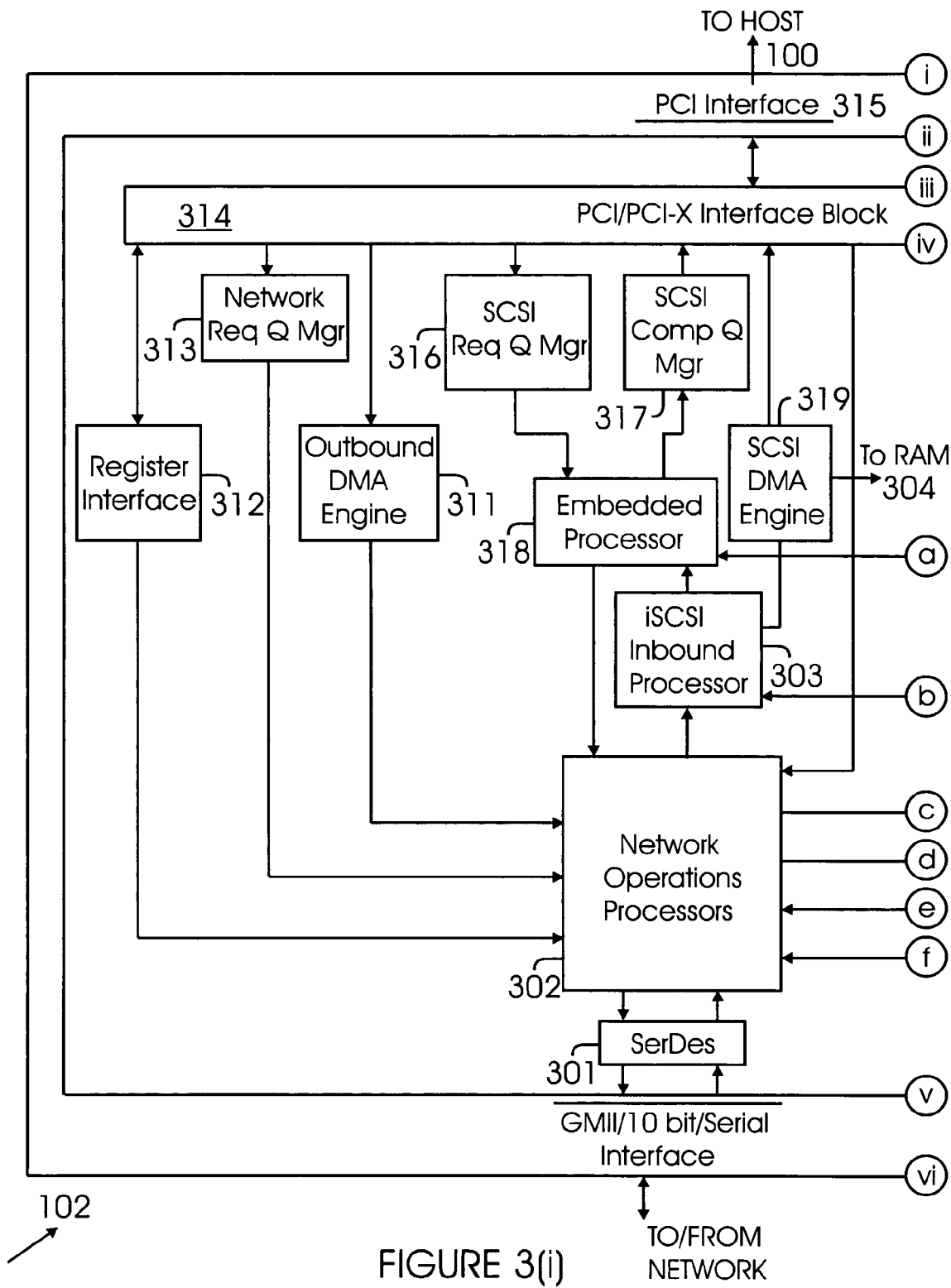
FIG. 3 is a block diagram of a TOE accelerator, according to one aspect of the present invention.
Figure 3:
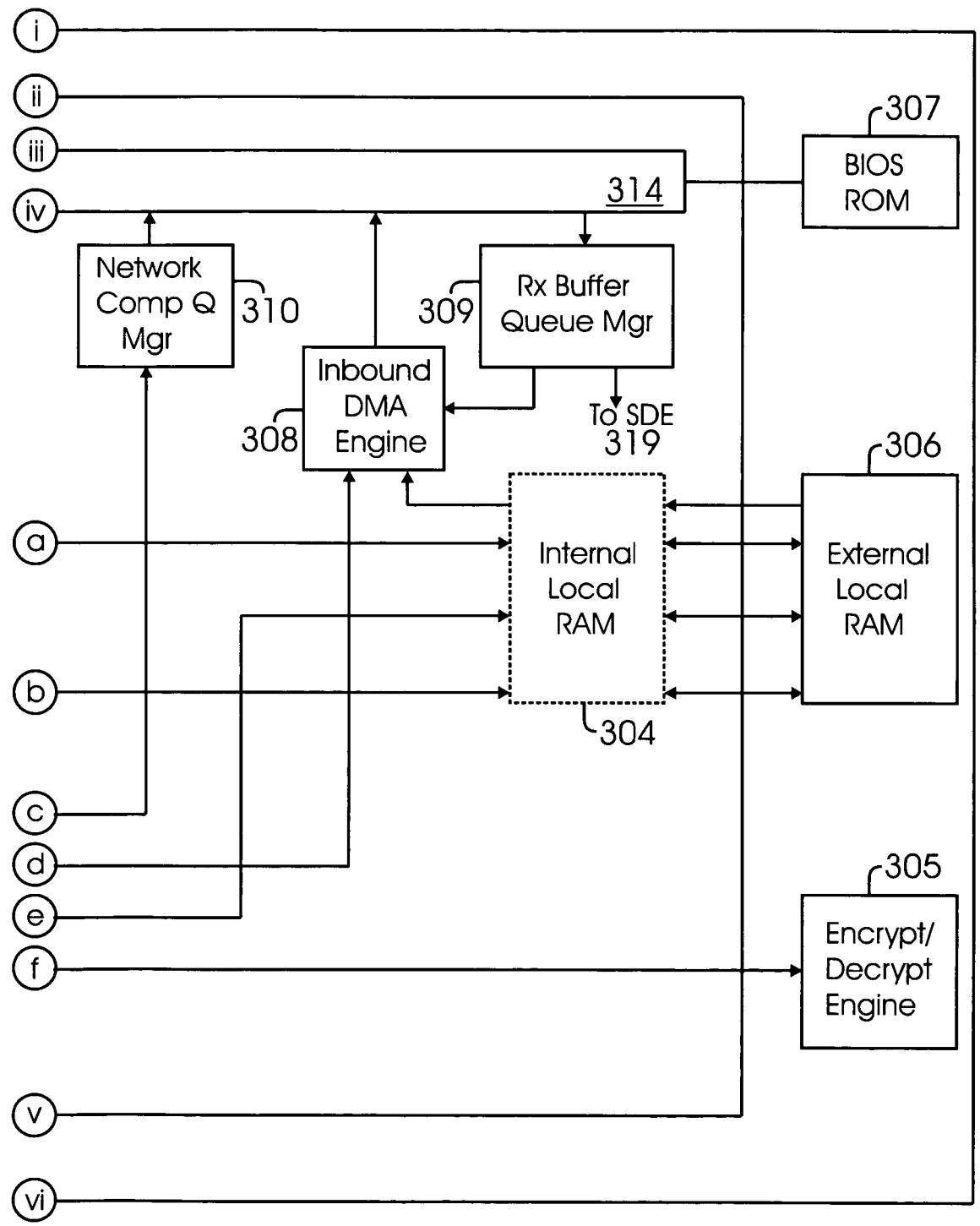

FIG. 3 shows a block diagram of system 102 according to one aspect of the present invention, with various components described below.

System 102 includes an embedded processor 318 that is used to process SCSI requests into iSCSI exchanges to transfer SCSI based data. Processor 318 also generates completion messages for host 100.

iSCSI processor 303 includes hardware state machines/firmware which synchronizes incoming byte streams from TCP, finds iSCSI PDU boundaries, sends data to host 100 via SCSI direct access memory ("SDE") module 319.

System 102 also includes network operation processors "NOP" 302 that include plural state machines for different network protocols, for example, TCP, IP, and Ethernet for both traffic entering and leaving system 102. The state machines handle most of the data transfer without host CPU 107 involvement.

Local memory interface 304 is used by various system 102 components to access external memory 306 (in this illustration, RAM 306).

Encryption/de-cryption engine 305 is used to encrypt/decrypt data while data is moved in and out of host 100, using system 102. Standard encryption/de-cryption techniques may be used.

Two DMA engines (or modules) are used by NOPs 302 to move data to and from host 100. Inbound DMA module 308 is used to move data from system 102 (i.e. from local memory 306) to host 100 memory. Buffer queue manager 309 maintains small and large buffers that are used by Inbound DMA engine 308. Outbound DMA engine 311 is used to move data from host 100 memory to system 102 for transmission to the network.

SCSI DMA Engine (SDE 319) provides iSCSI processor 303 with a DMA channel from Local RAM 306 to Host 100 memory. SDE 319 includes a byte packer function that takes unaligned or less than 8 byte buffers and packs them into 8 byte words before sending them to Host 100. SDE 319 also includes detection/location logic 400, described below with respect to FIG. 4 that handles markers, digests and DIFs "on the fly" while data is being moved to host 100 from local memory 306 and vice-versa.

System 102 also includes request queue managers (the term manager and module are used interchangeably throughout this specification) (313 and 316) that are used to pass commands to chip 102 to perform a specific operation. SCSI request queue manager 316 is used for initiating SCSI based transfers, while module 313 is used for TCP, IP, Ethernet or any other protocol/standard.

Completion queue managers (310 and 317) are used to send completion messages to host 100. These messages are generated to report status of inbound (i.e. from the network to system 102 and then to host 100) to outbound (i.e. from host 100 to the network via system 102) transfers. SCSI completion manager 317 handles SCSI completion messages, while non-SCSI messages are handled by module 310.

Register interface 312 provides host 100 access to plural system 102 status and control registers, as well as a channel to access local memory 306.

PCI/PCI-X interface block 314 and PCI interface 315 provide a PCI/PCI-X interface between host 100 and system 102. BIOS Read only memory 307 is also provided to store invariant instruction sequences such as start-up instruction sequences or basic input/output operating system (BIOS) sequences instructions.

Data enters/leaves system 102 through a serial/de-serializer ("SERDES") 301 that converts incoming and outgoing data into a serial and non-serial format.

Handling Markers, DIFs and Digests for Incoming PDUs:

As discussed above, incoming in this context means PDUs coming from the network destined for host 100 via system 102. Prior to describing the logic and process for handling markers, DIFs and digests, a SCSI PDU will be described with respect to FIG. 5A.

Figure 5A:
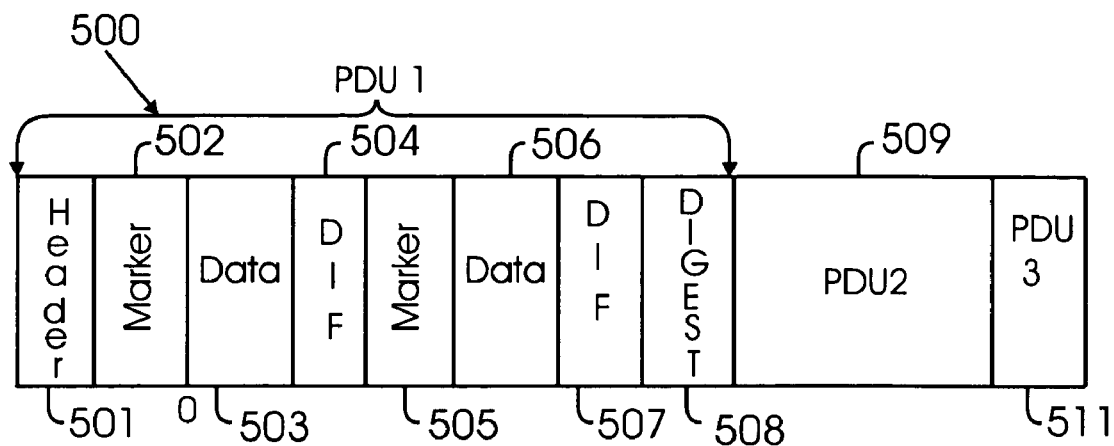
FIGS. 5A-5C show various block diagrams of a protocol data unit that are processed, according to one aspect of the present invention.

FIG. 5A shows PDUs 500, 509 and 511. The overall structure of the PDUs is the same and hence only PDU 500 is shown with all the components. It is noteworthy that the present invention is not limited to any particular number of PDUs and the three PDUs are shown to illustrate the overall data structure of the PDUs. Also, PDUs 500, 509 and 511 may not be received in particular order.

PDU 500 includes a header 501, with a first marker 502. Thereafter, markers are placed evenly, for example, every 512 KB (shown as marker 505). Data itself is shown as 503 and 506. DIFs 504 and 507 follow data blocks 503 and 506, respectively. The last part of PDU 500 is digest 508. It is noteworthy that the boundaries between PDU 1 and 2 overlap, i.e., digest 508 may be received with a portion of PDU 2, shown as 509.

Figure 4I:
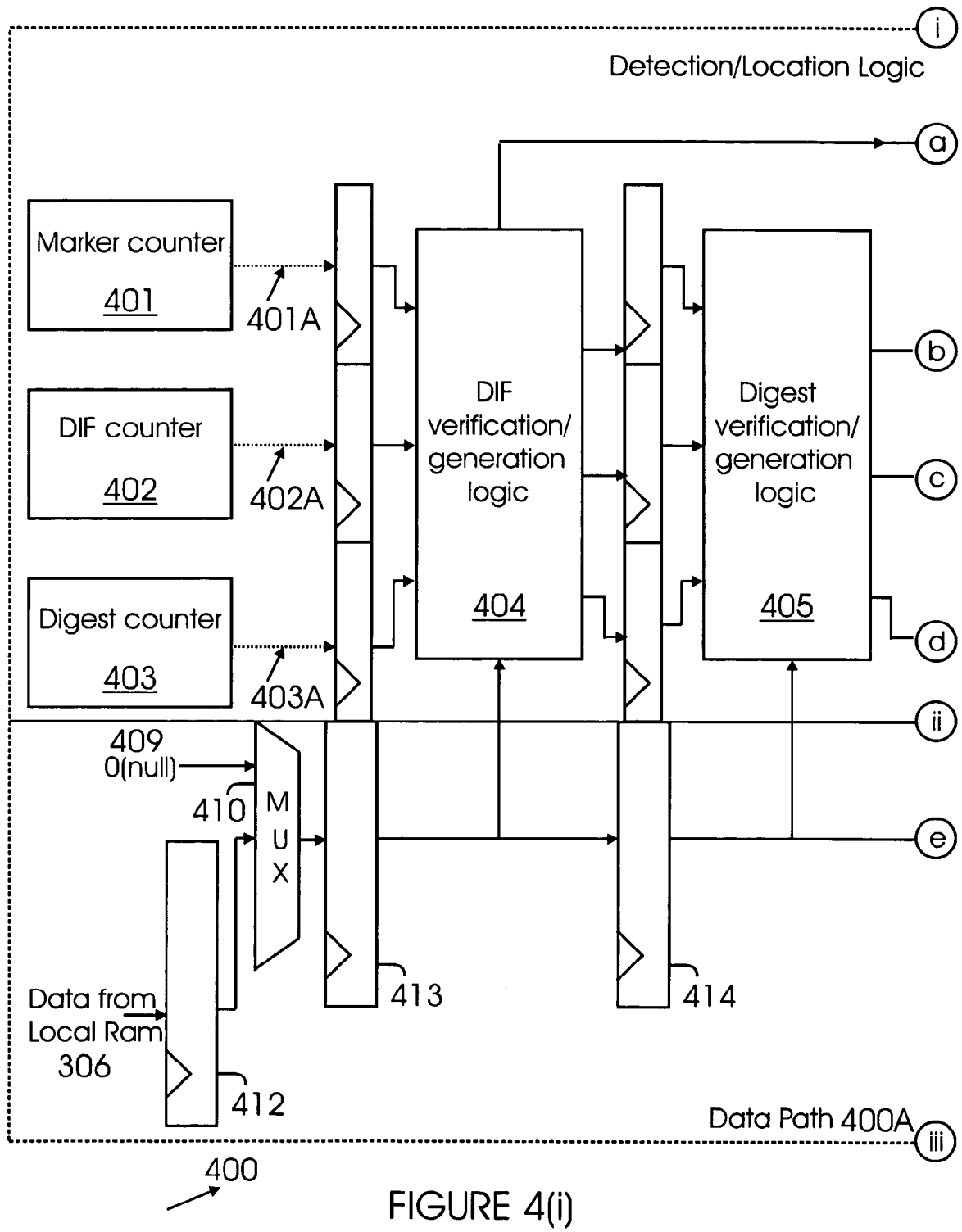
FIG. 4 is a block diagram of logic used to process markers, DIFs and digests for data entering from a network into the TOE accelerator, according to one aspect of the present invention.
Figure 4:
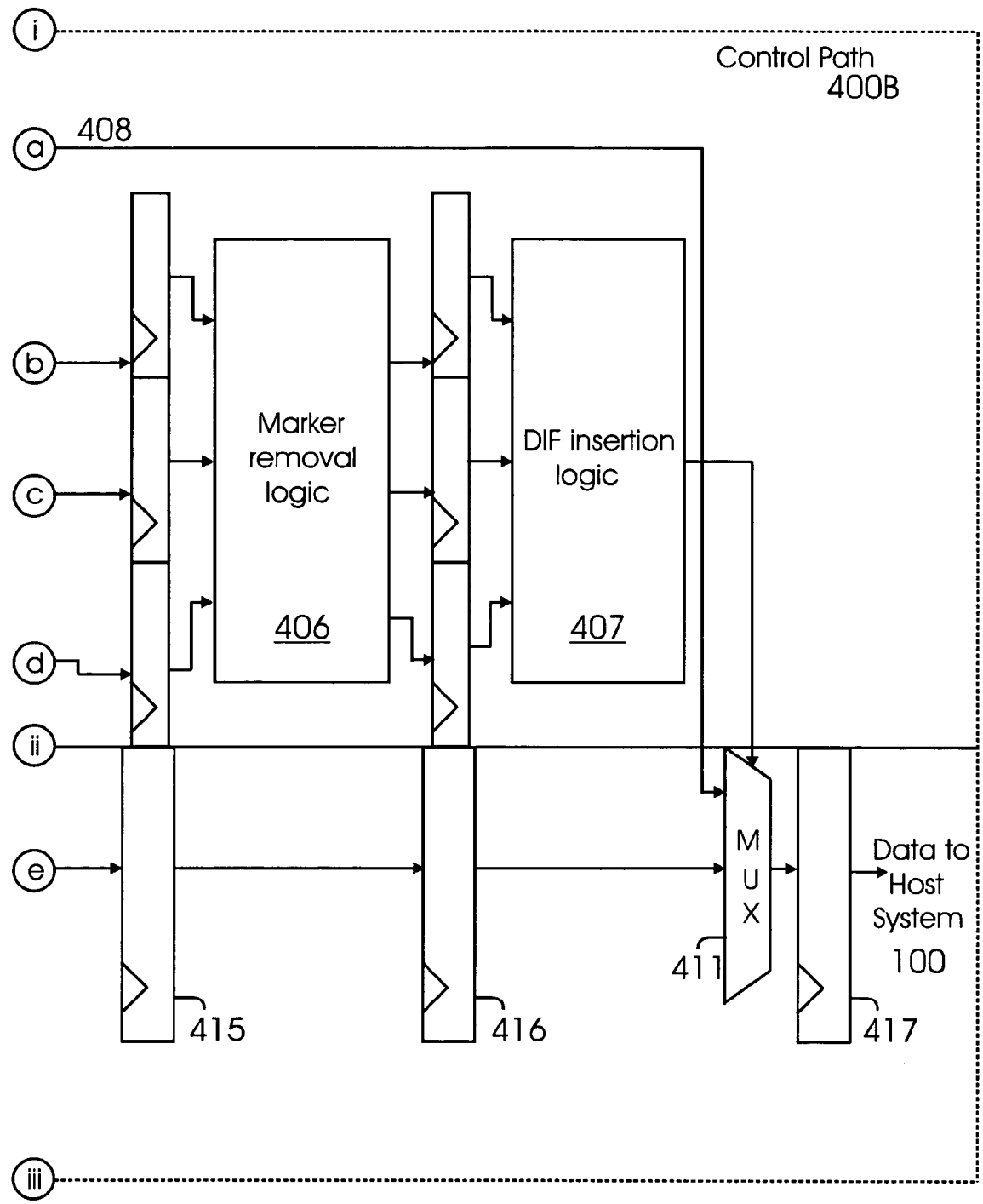

FIG. 4 shows a block diagram of a system 400 for detecting and processing markers, DIFs and digests for data that is transferred from local memory 306. System 400 may be located in SDE 319.

In FIG. 4, the data path is shown as 400A, while the control path is shown as 400B. In the data path 400A, data is moved from local memory 306 and a null word 409 is inserted if the DIF processing is to be conducted in the Append mode. Data word 413 is processed through multiplexer ("Mux") 410.

As the data stream progresses, DIF verification logic 404 and digest verification logic 405 process the DIF and digest values. Marker removal logic 406 is used to remove any markers, if enabled. DIF insertion logic 407 is used to insert DIF values in a data stream. Data words 414, 415, and 416 are shown as they are handled by logic 404, 405 and 406.

Mux 411 outputs data word 417 that is then sent to host 100. Mux 411 receives an input from DIF insertion logic 407 and input 408 if the Append mode is being used.

System 400 includes three separate location counters 401, 402 and 403 for markers, DIFs and digests, respectively. As data-words (shown as 413, 414, 415 and 416) in a data stream pass by, each counter (i.e., 401, 402 and 403) increments when appropriate, by an appropriate count. Separate Marker, DIF and Digest Locator bits (shown as 401A, 402A and 403A) are used to indicate when respective bytes in a current word belong to one of the fields (i.e., markers, DIFs and/or digests).

When a counter (401, 402 and/or 403) reaches an appropriate programmable threshold for a field it is used to locate, the corresponding locator bits are set for that field. The locator bits for each field is then fed back into the increment logic for each of the other field locator counters, so they can correctly increment. The locator bits are then forwarded with each data word through several stages in a pipeline where the markers, DIFs and digests are processed. The CRC calculators (not shown) use the locator bits to determine, which bytes in the current word to include in the calculation.

Marker Processing:

When host 100 is ready to communicate with system 103A, the devices negotiate whether markers will be supported. If both devices support markers, then system 102 removes markers from data stream, before data is sent to host 100 from local memory 306. It is noteworthy, that markers can be inserted arbitrarily and this becomes complex when received PDUs are out of order.

Figure 5B:
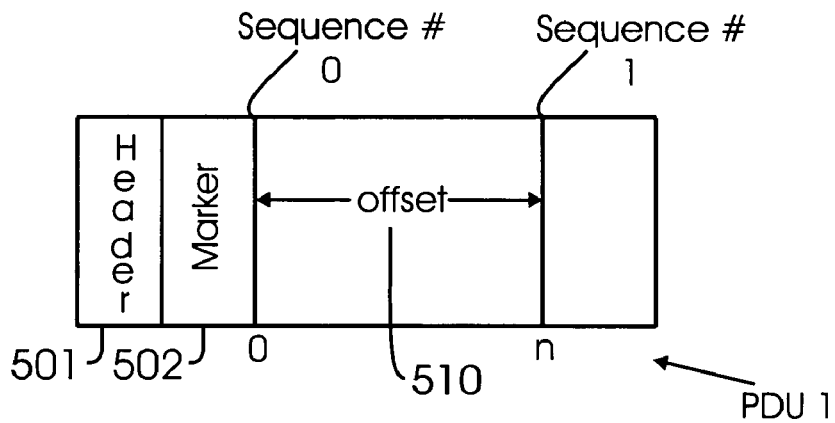

It is important that system 102 for a given data stream determines the location of the first marker in a given data stream. Normally, other markers occur at regular intervals, for example, every 512 KB. To locate markers in a data stream for a given DMA requires the offset of the first word in the DMA from the first marker (shown as 502) in the data stream (shown as PDU 1, PDU 2 and PDU 3 (511) in FIG. 5). The offset is shown as 510 in FIG. 5B that shows a partial view of PDU 1, described above with respect to FIG. 5A.

By knowing the offset, the first marker 502 location in a given DMA is known. This offset value is divided by marker interval size (for example, 512 KB) and the remainder from the division is primed into the marker location counter 401 at the start of a DMA process. When each word passes by counter 401, it is incremented by the number of bytes in the word. When (marker counter modulo marker interval=0) the marker bits are set (for example, for an 8- or 4-byte marker), counter 401 is not incremented for bytes. Once markers are located they are removed by logic 406 after DIFs and digests are processed.

Processing DIFs:

Once the initial location of the DIF field is determined for a DMA (i.e. data transfer), then DIFs may be handled in three different modes by system 102:

Insert (Append) mode: DIFs are inserted before data is sent to host 100 from local memory 306;

Validate and Remove Mode: DIFs are validated and then removed before data is sent to host 100; and Validate and Keep Mode: DIFs are validated and kept before data is sent to host 100.

The foregoing modes can be programmed and controlled by firmware of system 102.

Figure 5C:
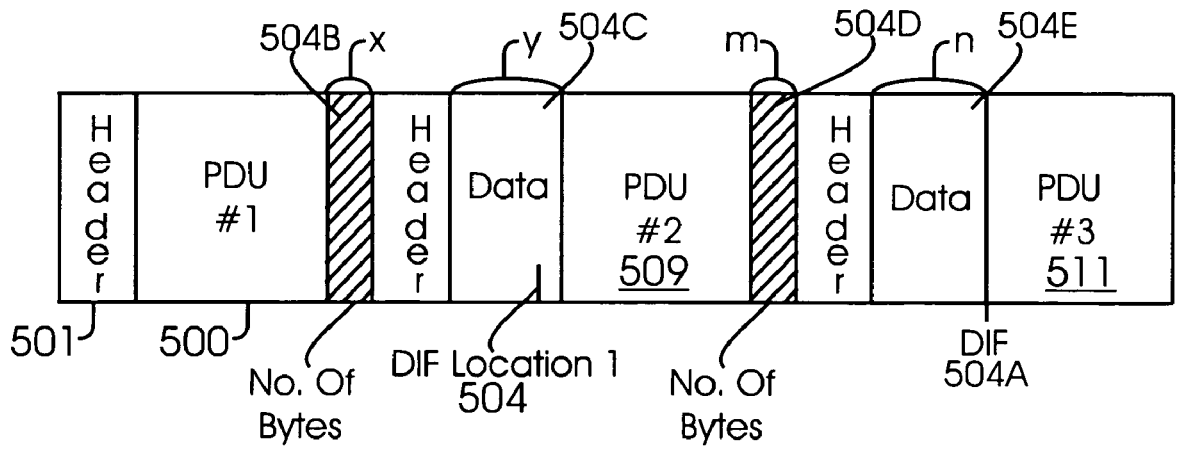

Before describing how DIFs are processed, it is noteworthy that DIF boundaries and PDU boundaries are not always perfectly aligned and may often overlap. FIG. 5C shows three PDUs (1, 2 and 3) adjacent to each other, however, the PDUs may not be received in order by local memory 306 and SDE 319. Therefore, in one aspect of the present invention, the last number bytes that are transferred for a PDU with a partial CRC are stored so that a next PDU can be processed. For example, as shown in FIG. 5C, to process PDU 2, the last few bytes of PDU 1 (shown as "x", 504B) are stored with partial CRC. This is used for processing 504C, which also has DIF 504. The same is applicable for processing PDU 3, where block 504D (shown as "m") is stored to process 504E (shown as "n") with DIF 504A.

DIF logic 404 uses the offset of the first byte in a DMA from the previous DIF (for example, 504B), as well as the partial CRC calculation of the block to that point to locate and process a DIF. These values are seeded into logic 404 and the DIF CRC calculator (not shown), respectively. The DIF counter 402 is incremented for each byte (shown as data word 412) that passes by. When the counter is equal to the DIF block size, the DIF locator bits corresponding to the DIF bytes in a current word are set and the DIF counter 402 is reset. Both the Marker locator bits 401A and the Digest locator bits 402A are fed into logic 404. If any of the bits are set, the DIF counter 402 is not incremented for the bytes corresponding to those bits. In the Append mode, if SDE 319 is to insert the calculated DIF values (shown as 408) into the data stream, an empty word (shown as 409) is inserted and the corresponding DIF locator bits for that word set.

Processing Digests:

Digests are located in the last few bytes (for example, 4) of a PDU. Thus, for a given DMA, the current offset into the PDU, the length of the PDU, and the DMA length determine whether the last 4 bytes of the DMA are digests, i.e., if the DMA length+PDU offset is equal to the PDU Length, then the last 4 bytes of the DMA are digests. When the digest locator counter 403 are equal to the PDU length, the digest locator bits 403A are set for the bytes in a current word corresponding to the digest. When transferring iSCSI data, marker locator bits 401A are also fed into the digest logic 405.

In one aspect of the present invention, the three fields discussed above are handled, real-time while data is being transferred. System 400 is also able to process the variations in how the various fields are used. For example, markers are not used for digest calculations; or three different modes may be used to process DIFs. For iSCSI transfers, markers are not used when DIFs are calculated, but markers are used for RDMA based transactions. The indicator bits for markers, DIFs and digests are used to handle different situations and requirements. Logic 404, 405 and 406 are adaptive and hence process markers, DIFs and digests, based on the requirements.

The following provides an example of how SDE 319 processes markers, DIFs and digests, according to one aspect of the present invention:

"set_marker_locator": Set bit(s) indicating the current word contains a marker;

"set_dif_locator": Set bit(s) indicating the current word contains a DIF;

"set_digest_locator": Set bit(s) indicating the current word contains a digest;

"marker_counter": Byte counter used to track location of markers in the data stream;

dif_counter: Byte counter used to track location of DIFs in the data stream;

digest_counter: byte counter used to track location of digest in the data stream;

"dif_append_mode": DIF mode is append (insert into data stream);

"marker_interval": how often in the data stream a marker is expected to appear;

"pdu_length": length of the PDU being transferred to the host;

"dif_block_size": size of data block covered by a DIF

BUS_WIDTH_BYTES: constant indicating width of the data bus in bytes.

set_marker_locator=
((marker_counter==marker_interval) &&
!(digest_counter==pdu_length) );
set_dif_locator=((dif_counter==dif_block_size)
&& !set_marker_locator &&
(dif_mode_append ||!(digest_counter==pdu_length)));
set_digest_locator=((digest_counter==pdu_length) &&
!(dif_mode_append && (dif_counter==dif_block_size)) );
if (set_marker_locator)
marker_counter <=0;
else if (!set_dif_locator && dif_mode_append)
marker_counter <=marker_counter+BUS_WIDTH_BYTES;
if (set_dif_locator)
dif_counter <=0;
else if (!set_marker_locator)
dif_counter <=dif_counter+BUS_WIDTH_BYTES;
if (!set_marker_locator && !(set_dif_locator &&
dif_append_mode))
digest_counter <=digest_counter+BUS_WIDTH_BYTES;

Handling Markers, DIFs and Digest for Outgoing Data

As discussed above, outgoing in this context means any data that is sent by host 100 via chip 102. In one aspect of the present invention, markers, DIFs and digests are located and processed concurrently for both iSCSI and RDMA, reducing logic duplication and providing protection from data corruption.

In one aspect of the present invention, markers, DIFs and digests are processed concurrently by using a data pipeline that tags every byte with routing bits. The routing bits are used to control data flow through the pipeline. Counters at the first stage of the pipeline are used to control the routing bits. As bytes in the data stream pass by, each counter decrements when appropriate, by an appropriate count. When a counter reaches a certain value, for example, 0, for the field it is used to locate, then the corresponding routing bits are set for that field.

Separate Marker, DIF and Digest Routing bits are used to indicate when respective bytes in a current word belong to one of the fields. There are also separate routing bits that indicate when the last byte in each block passes and if data should be transmitted out of system 102. The routing bits are then carried forward with each data word through the pipeline to where Markers, DIFs and Digests are processed. The Digest (CRC) calculators use the routing bits to determine which bytes in the current word to include in the calculation. The end bits are used to determine when and where to insert a Digest into the data stream.

Figure 6I:
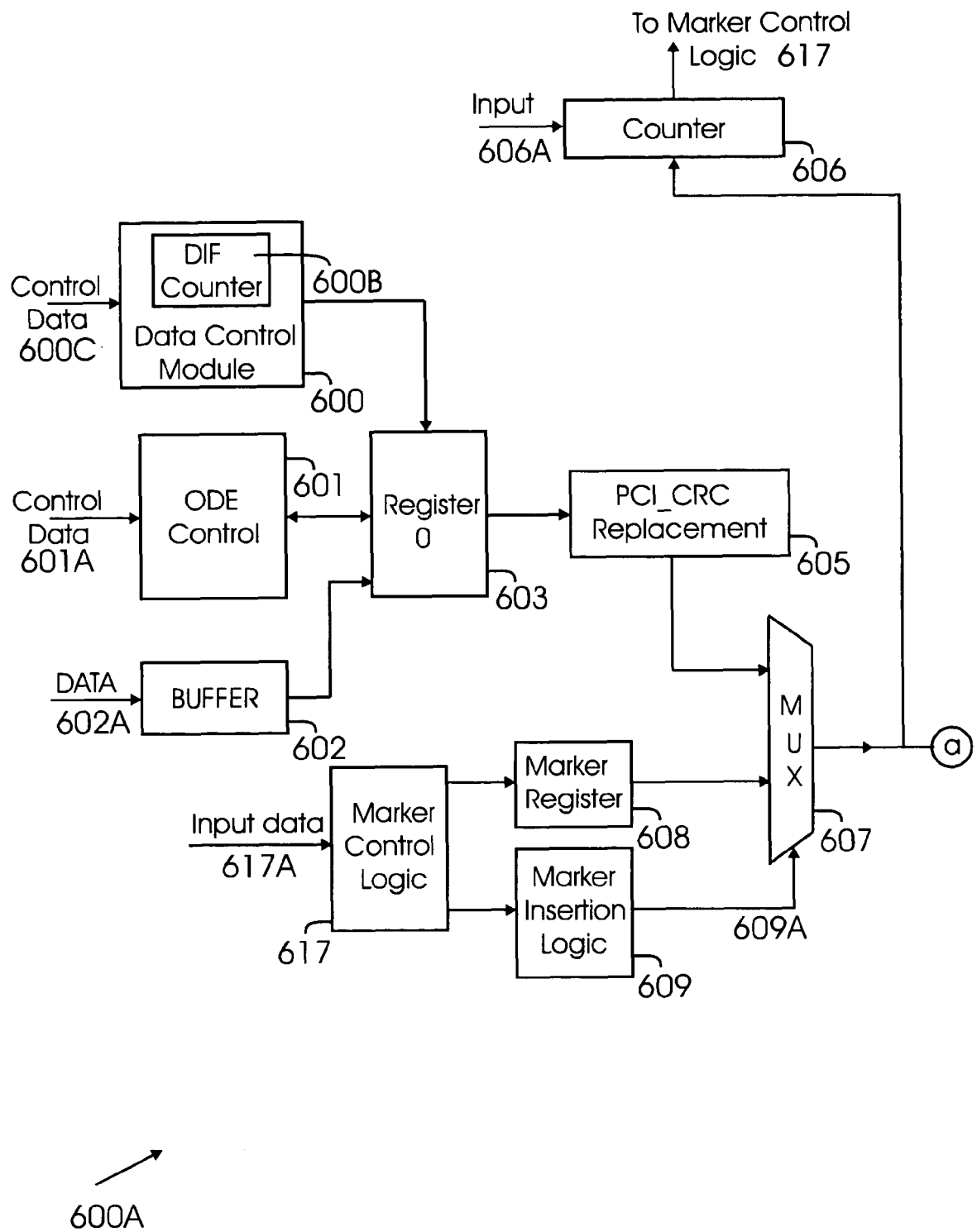
FIG. 6 is a block diagram of logic used to process markers, DIFs and digests for data leaving the TOE accelerator to a network, according to one aspect of the present invention.
Figure 6:
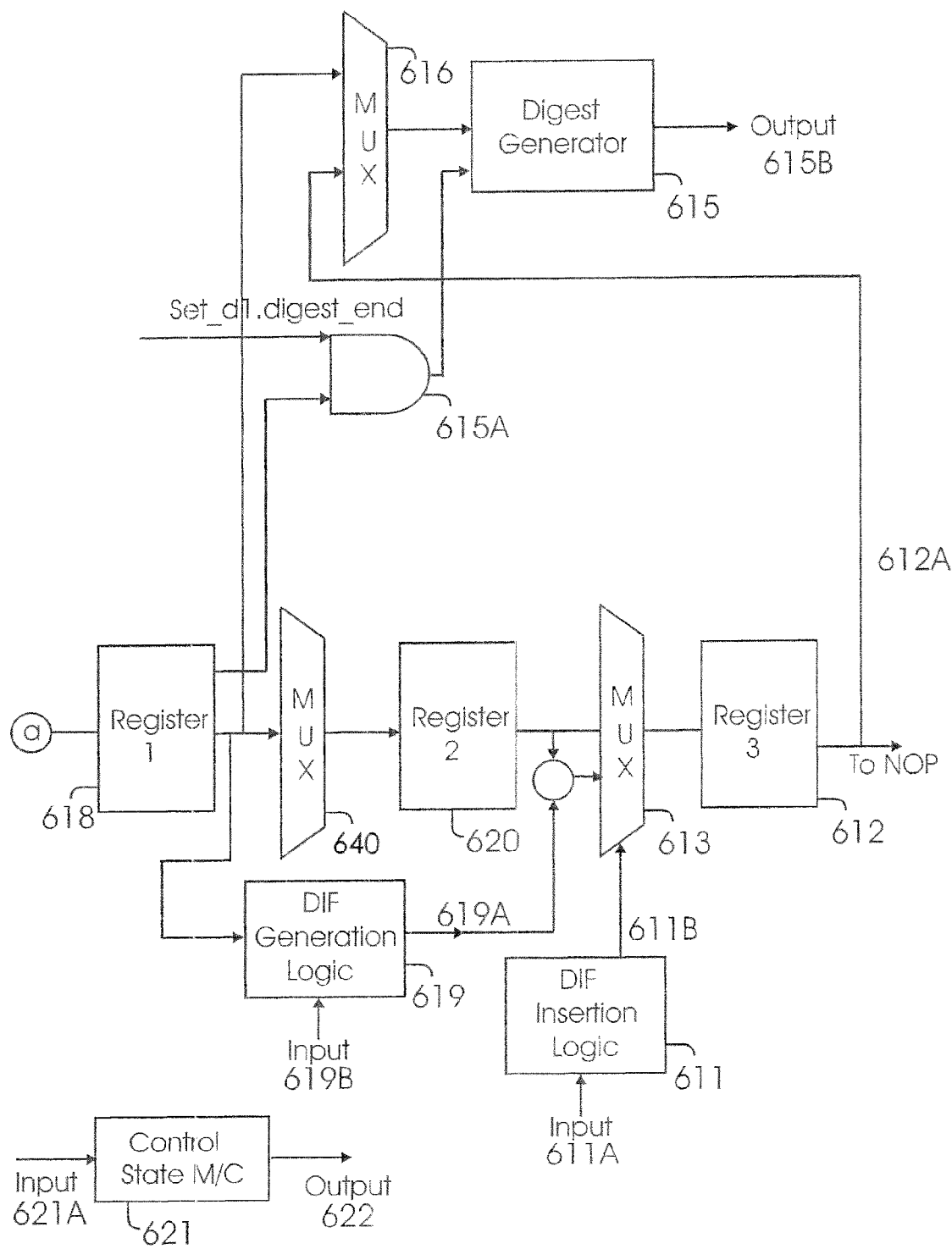

FIG. 6 shows a block diagram of a system 600A that is used to concurrently handle markers, DIFs and digests in one aspect of the present invention. System 600A is incorporated in one of the network processors 302, namely an outbound IP/MAC processor or state machine (not shown).

System 600A includes a data control module 600 that receives control data/input 600C from a control state machine 621. Control data 600C includes signal/routing bits to either pass certain bytes or ignore certain bytes. Module 600 also includes a DIF counter 600B that is described below.

Control state machine 621 generates output 622 that includes various control signals, including, a bit to set the Append mode; validate and keep mode; validate and replace mode; a bit for starting marker control logic 617; a bit signifying a new data block; sequence number of a segment; a bit that initializes counters 600B and 606; and a valid bit mask.

System 600A also includes ODE control module 601 that receives control/data 601A from control state machine 621.

A marker control module 617 is provided that receives input 617A. Included in input 617A is an output of counter 606 that counts the number of bytes in a segment that passes through system 102. Marker control module 617 also receives a flag that signifies if the data is for iSCSI or RDMA (rdma_1-cl_flag). Input 617A also includes the sequence number for a TCP segment, and a marker value.

Inserting Markers:

Marker control module 617 is coupled to a marker register 608 that is used to store marker values. Register 608 also has a bit that indicates when register 608 is full.

Marker insertion logic 609 receives input from marker control module 617, which includes the total number of bytes for marker insertion. Output from counter 606 also serves as an input for marker insertion logic 609. Marker insertion logic 609 output 609A is sent to multiplexer 607 that also receives input from register 608.

Insertion of markers in a data stream for a given DMA requires the offset of a first word in a DMA from the first marker in the data stream. This value is calculated from state information saved about a connection for which a transfer takes place at a given time. When each word passes by Marker counter 606, it is decremented by the number of bytes in the word. When the Marker counter 606 reaches a certain value, for example, 0, the data stream is interrupted and an 8- or 4-byte marker is inserted by marker insertion logic 609 depending upon whether the data stream is iSCSI or RDMA based.

Routing bits are set along with the marker to indicate DIF or Digest routing. For insertion of subsequent markers in the same TCP segment, after a marker is inserted in the data stream, the Marker counter 606 is set to the value of the marker interval. The routing bits are sent to the Marker counter 606 (input 606A). If the routing bits indicate that a particular byte will not be transmitted, the Marker counter 606 is not decremented.

DIFs:

System 102 verifies DIFs for every byte of data that is sent out. Since retransmission of TCP data can occur at any byte in the data stream, it is possible that data from the host 100 may not be transmitted. To know which bytes should be transmitted, commands to pass or ignore (in this example, number_of_bytes_2_pass and number_of_bytes_2_ignore) the bytes are passed to a function that counts every byte received from host 100. If the number of bytes received is greater than the number_of_bytes_2_ignore and less than or equal to (number_of_bytes_2_pass+number_of_bytes_2_ignore) a routing bit is set for that byte.

DIF location is ascertained by knowing the size of a DIF data block and the DIF operating mode (i.e. Append, Validate and Remove, or Validate and Keep). Since every byte of data transmitted has it's DIF verified, data from host 100 begins with the first byte of data in the DMA block. Hence, all bytes from host 100 have the DIF routing bit set. DIF counter 600B (located in Data Control block 600) is initially loaded with the size of the DIF data block and decremented for each byte that passes by. When counter 600B is equal to a certain value, for example, zero, routing bits (DIF_END) in the current word are set and the DIF counter is re-set to the size of the DIF data block. The DIF_END routing signal is used to know when to insert a DIF into the data stream, when to compare a calculated DIF in the data stream, and/or when to remove a DIF from the data stream. If a calculated DIF needs to be inserted into the data stream, an empty word is inserted in the data stream and the corresponding DIF routing bits for that word are set.

System 600A includes plural registers 603, 618, 620 and 612 as a part of the data pipeline that handles DIFs, digest and markers. Register 603 (Stage 0 register) is controlled by module 601 and data control module 600. Register 603 includes information relating to the last block data, the length of valid bytes, a bit for the append mode (for example, 0), a bit that starts sending the most and least significant bits to NOP 302. Register 603 also includes where the DIF (pci-Crc) is located and a value that indicates when the DIF ends (pci_crc-end).

Register 618 is the next register in the data pipeline that receives an input from Mux 607. Protection data from module 605 is added in the data stream (in the append mode) before data is placed in register 618. Data from register 618 is sent to DIF generator logic module 619 that also receives the relevant CRC information as input 619B. Module 619 checks/generates CRC value(s) 619A that is then included in the data stream from register 620, which receives data through Mux 640.

DIF insertion logic 611 receives input 611A from control state machine 621. Input 611A enables a particular DIF mode, namely, the Append mode (i.e. the Insert Mode), Validate and Keep mode; and validate and remove mode.

If the append mode is enabled, then DIF 611B is inserted in the data stream through Mux 613. If the validate and replace mode is enabled, then CRC values are validated and then replaced. If validate and remove mode is enabled, then CRC values are removed after validation.

Figure 7:
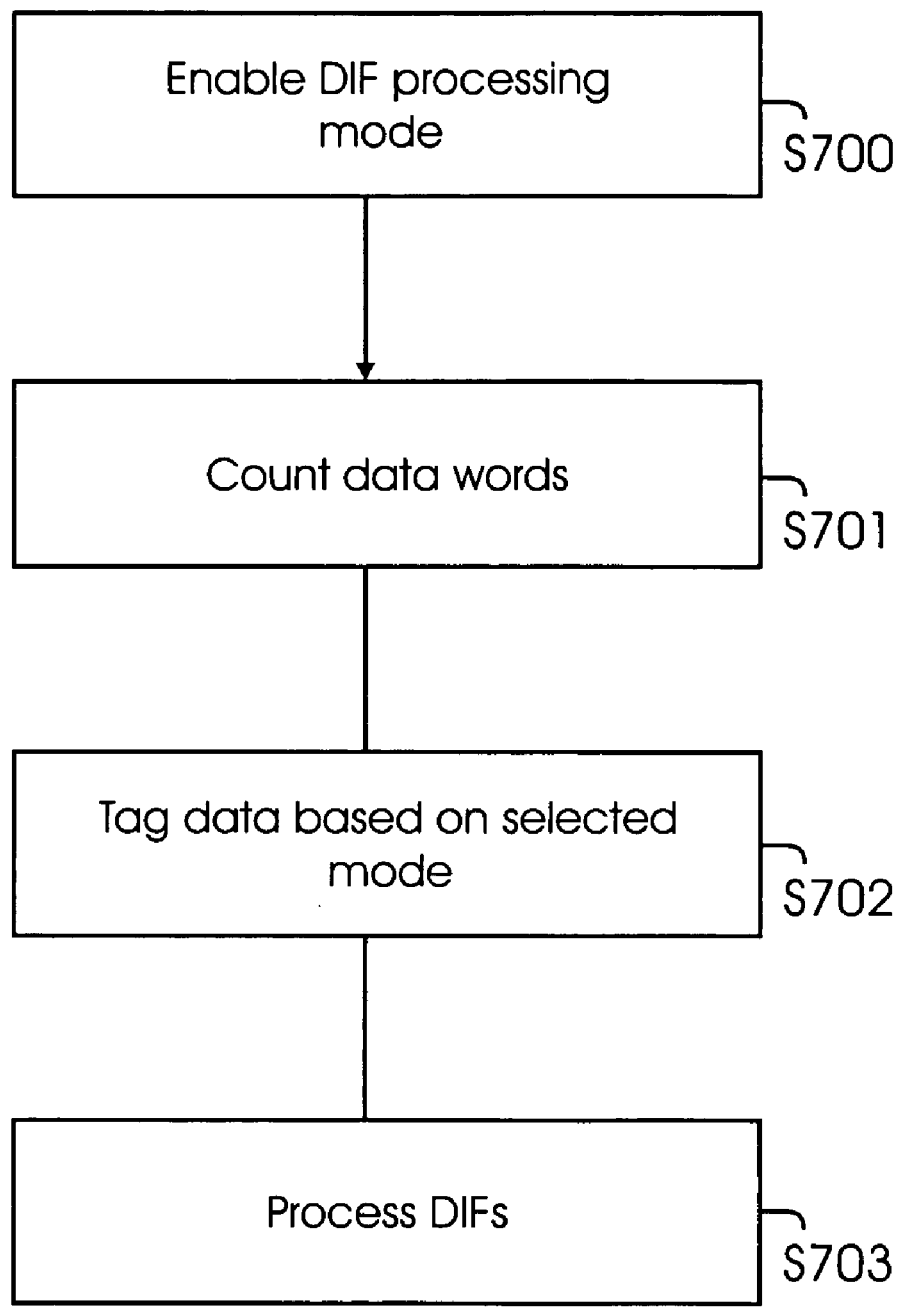
FIG. 7 is a process flow diagram for handling DIFs for data leaving the TOE accelerator to a network, according to one aspect of the present invention.

FIG. 7 shows a flow diagram of executable process steps for handling DIFs, according to one aspect of the present invention.

In step S700, the process enables the DIF mode, i.e., the Append mode, Validate and Remove mode, or Validate and keep mode. In step S701, data words are counted, as discussed above with respect to FIG. 6.

In step S702, data is tagged based on the type of mode that is selected.

In step S703, DIFs are processed based on the type of mode that is selected.

Digests:

Register 612 includes data where markers and DIFs have been processed, as described above. Digests are inserted after the last bytes of data are received from a DMA request. Control signals are generated for each DMA request to indicate if this data is to be included in the digest calculation and if this is the last DMA request before a digest should be inserted. This is stored in register 620. These signals along with the routing bits are used to set the digest routing signal for data received from host 100.

The DIGEST routing signal and an end bit that comes down with the data are used to set a digest end (DIGEST_END) routing bit. The bit is sent to digest generator 615 via logic 615A. When the byte with the DIGEST_END routing bit reaches the digest generator, the computed digest is inserted in the data stream (shown as output 615B).

Protection data 612A (for Append and validate/Remove mode) from register 612 is routed back to Mux 616 that also receives an input from register 618. Mux 616 generates an output that serves as an input for digest generator 615.

In one aspect of the present invention, markers, digests and DIFs are handled concurrently and efficiently, which saves the cost of having separate logic and improves overall performance.

Although the present invention has been described with reference to specific embodiments, these embodiments are illustrative only and not limiting. Many other applications and embodiments of the present invention will be apparent in light of this disclosure and the following claims.

What is claimed is:

1. A host bus adapter (HBA) operationally coupled to a host computing system for sending and receiving information to and from a network device, the HBA comprising:

a TCP/IP offload engine (TOE) device having a detection/location logic for concurrently processing markers, data integrity fields ("DIFs") and digests using a marker locator bit, a DIF locator bit and a digest locator bit in a control path that is used to control data flow in a data path;

wherein the detection/location logic includes (i) a DIF counter whose value is used for setting the DIF locator bit in a data stream for processing DIFs in an append mode where a DIF is inserted in the data stream, for processing DIFs in a validate and remove mode where the DIF is validated and removed from the data stream, and for processing DIFs in a validate and keep mode where the DIF is validated and kept in the data stream; (ii) a digest counter whose value is used for setting the digest locator bit such that digests are processed by a digest verification and generation logic when the data stream reaches the digest verification and generation logic and (iii) a marker counter whose value is used for setting the marker locator bit such that a marker can be identified and removed from the data stream by a marker removal logic when the data stream reaches the marker removal logic.

2. The host bus adapter of claim 1, wherein when the DIF counter, the digest counter and the marker counter reach a certain threshold value, then the DIF, the digest and the marker locator bits are set and the locator bits are forwarded with the data stream.

3. The host bus adapter of claim 1, wherein for processing markers, an offset value of a first word in a direct memory access ("DMA") transfer from a first marker location is primed into the marker counter.

4. The host bus adapter of claim 3, wherein the marker counter is incremented when each word in the data stream passes by the marker counter and markers are inserted at a programmed interval.

5. The host bus adapter of claim 1, wherein for processing DIFs an offset of a first byte in a direct memory access (DMA) transfer and partial cyclic redundancy code value is seeded into the DIF counter, which is incremented for each byte of data that passes by the DIF counter.

6. The host bus adapter of claim 5, wherein for processing DIFs in the append mode a null word is inserted in the data stream.

7. The host bus adapter of claim 1, wherein if the digest counter value is equal to a protocol data unit (PDU) length, then digest locator bits are set for bytes in a current word.

8. The host bus adapter of claim 7, wherein the digest locator bits and marker locator bits are sent to the DIF counter.

9. A system, comprising:
a network device for sending and receiving information;
a computing system operationally coupled to a host bus adapter for communicating with the network device; wherein the host bus adapter includes a TCP/IP offload engine (TOE) device having a detection/location logic for concurrently processing markers, data integrity fields ("DIFs") and digests using a marker locator bit, a DIF locator bit and a digest locator bit in a control path that is used to control data flow in a data path;
wherein the detection/location logic includes (i) a DIF counter whose value is used for setting the DIF locator bit in a data stream for processing DIFs in an append mode where a DIF is inserted in the data stream, for processing DIFs a validate and remove mode where the DIF is validated and removed from the data stream, and for processing DIFs in a validate and keep mode where the DIF is validated and kept in the data stream; (ii) a digest counter whose value is used for setting the digest locator bit such that digests are processed by a digest verification and generation logic when the data stream reaches the digest verification and generation logic and (iii) a marker counter whose value is used for setting the marker locator bit such that a marker can be identified and removed from the data stream by a marker removal logic when the data stream reaches the marker removal logic.

10. The system of claim 9, wherein when the DIF counter, the digest counter and the marker counter reach a certain threshold value, then the DIF, the digest and the marker locator bits are set and the locator bits are forwarded with the data stream.

11. The system of claim 9, wherein for processing markers, an offset value of a first word in a direct memory access ("DMA") transfer from a first marker location is primed into the marker counter.

12. The system of claim 11, wherein the marker counter is incremented when each word in the data stream passes by the marker counter and markers are inserted at a programmed interval.

13. The system of claim 9, wherein for processing DIFs an offset of a first byte in a direct memory access (DMA) transfer and partial cyclic redundancy code value is seeded into the DIF counter, which is incremented for each byte of data that passes by the DIF counter.

14. The system of claim 13, wherein for processing DIFs in the append mode a null word is inserted in the data stream.

15. The system of claim 9, wherein if the digest counter value is equal to a protocol data unit (PDU) length, then digest locator bits are set for bytes in a current word.

16. The system of claim 15, wherein the digest locator bits and marker locator bits are sent to the DIF counter.

17. A TCP/IP offload engine ("TOE") device for transferring data to and from a host computing system, comprising:
a detection/location logic for concurrently processing markers, data integrity fields ("DIFs") and digests using a marker locator bit, a DIF locator bit and a digest locator bit in a control path that is used to control data flow in a data path;
wherein the detection/location logic includes (i) a DIF counter whose value is used for setting the DIF locator bit in a data stream for processing DIFs in an append mode where a DIF is inserted in the data stream, for processing DIFs in a validate and remove mode where the DIF is validated and removed from the data stream, and for processing DIFs in a validate and keep mode where the DIF is validated and kept in the data stream; (ii) a digest counter whose value is used for setting the digest locator bit such that digests are processed by a digest verification and generation logic when the data stream reaches the digest verification and generation logic and (iii) a marker counter whose value is used for setting the marker locator bit such that a marker can be identified and removed from the data stream by a marker removal logic when the data stream reaches the marker removal logic.

18. The TOE of claim 17, wherein when the DIF counter, the digest counter and the marker counter reach a certain threshold value, then locator bits corresponding to the DIF, the digest and the marker are set and the locator bits are forwarded with the data stream.

19. The TOE of claim 17, wherein for processing markers, an offset value of a first word in a direct memory access ("DMA") transfer from a first marker location is primed into the marker counter.

20. The TOE of claim 19, wherein the marker counter is incremented when each word in the data stream passes by the marker counter and markers are inserted at a programmed interval.

21. The TOE of claim 17, wherein for processing DIFs an offset of a first byte in a direct memory access (DMA) transfer and partial cyclic redundancy code value is seeded into the DIF counter, which is incremented for each byte of data that passes by the DIF counter.

22. The TOE of claim 21, wherein for processing DIFs in the append mode a null word is inserted in the data stream.

23. The TOE of claim 17, wherein if the digest counter value is equal to a protocol data unit (PDU) length, then digest locator bits are set for bytes in a current word.

24. The TOE of claim 23, wherein the digest locator bits and marker locator bits are sent to the DIF counter.

25. A host bus adapter (HBA) communicating with a host communicating system, the HBA comprising:
- a TCP/IP offload engine (TOE) device having a logic for implementing a data pipeline that tags every byte of data with locator bits for controlling data flow through the data pipeline;
- wherein for concurrently processing markers, data integrity fields ("DIFs") and digests through the data pipeline, the logic uses a marker locator bit, a DIF locator bit and a digest locator bit in a control path;
- wherein the logic includes (i) a DIF counter whose value is used for setting the DIF locator bit in a data stream for processing DIFs in an append mode where a DIF is inserted in the data stream, a validate and remove mode where the DIF is validated and removed from the data stream and a validate and keep mode where the DIF is validated and kept in the data stream; (ii) a digest counter whose value is used for setting the digest locator bit such that digests are processed by a digest verification and generation logic when the data stream reaches the digest verification and generation logic and (iii) a marker counter whose value is used for setting the marker locator bit such that a marker can be identified and removed from the data stream by a marker removal logic when the data stream reaches the marker removal logic.

26. The host bus adapter of claim 25, wherein the locator bits for markers, DIFs and digests indicate when certain bytes in a data word include the markers, DIFs and digests as the data stream passes through the data pipeline.

27. The host bus adapter of claim 25, wherein the DIF counter is loaded with a size of a DIF data block and the DIF counter is decremented for each byte of data that passes by the DIF counter and a DIF locator bit is set that indicates when to insert a DIF value, compare a DIF value or remove a DIF value depending on the DIF processing mode.

28. The host bus adapter of claim 25, wherein the marker counter is used to count data words and at a certain counter value a marker is inserted.

29. The host bus adapter of claim 28, wherein an 8-byte or 4-byte marker is inserted in a data word.

30. A system, comprising:
- a host computing system operationally coupled to a network device via an adapter; wherein the adapter includes hardware logic for detecting and concurrently processing markers, data integrity fields (DIFs) and digests of a data stream received from the network device in a control path that is used to control data flow in a data pipeline; and wherein the hardware logic includes:
- a marker counter for setting a marker locator bit in the data stream;
- a DIF counter for setting a DIF locator bit for a DIF in the data stream;
- a digest counter for setting a digest locator bit for a digest in the data stream;
- a DIF verification and generation module configured to receive the marker locator bit, the DIF locator bit and the digest locator bit; that operates in (i) an insert mode for inserting a DIF in the data stream, (ii) a validate and remove mode for validating a DIF and removing the validated DIF from the data stream or (iii) a validate and keep mode for validating a DIF in the data stream and keeping the validated DIF;
- a digest verification and generation module for processing digests in the data stream; and
- a marker removal module configured to remove markers from the data stream after the DIFs and the digests are processed by the DIF verification and generation module and the digest verification and generation module.

31. The system of claim 30, wherein for processing DIFs, an offset of a first byte in a direct memory access (DMA) transfer and partial cyclic redundancy code value are seeded into the DIF counter, which is incremented for each byte of data that passes by the DIF counter.

32. The system of claim 30, wherein for processing a DIF in the insert mode, a null word is inserted in the data stream.

* * * * *

UNITED STATES PATENT AND TRADEMARK OFFICE
CERTIFICATE OF CORRECTION

| | | |
|---|---|---|
| PATENT NO. | : 7,761,608 B2 | Page 1 of 1 |
| APPLICATION NO. | : 10/931850 | |
| DATED | : July 20, 2010 | |
| INVENTOR(S) | : Derek Rohde et al. | |

It is certified that error appears in the above-identified patent and that said Letters Patent is hereby corrected as shown below:

In column 11, line 65, delete "640" and insert -- 617 --, therefor.

Signed and Sealed this

Twelfth Day of October, 2010

David J. Kappos
*Director of the United States Patent and Trademark Office*